F. A. TONEY.
COMBINATION PLANTER.
APPLICATION FILED SEPT. 6, 1912.
1,081,345.
Patented Dec. 16, 1913.
2 SHEETS—SHEET 1.
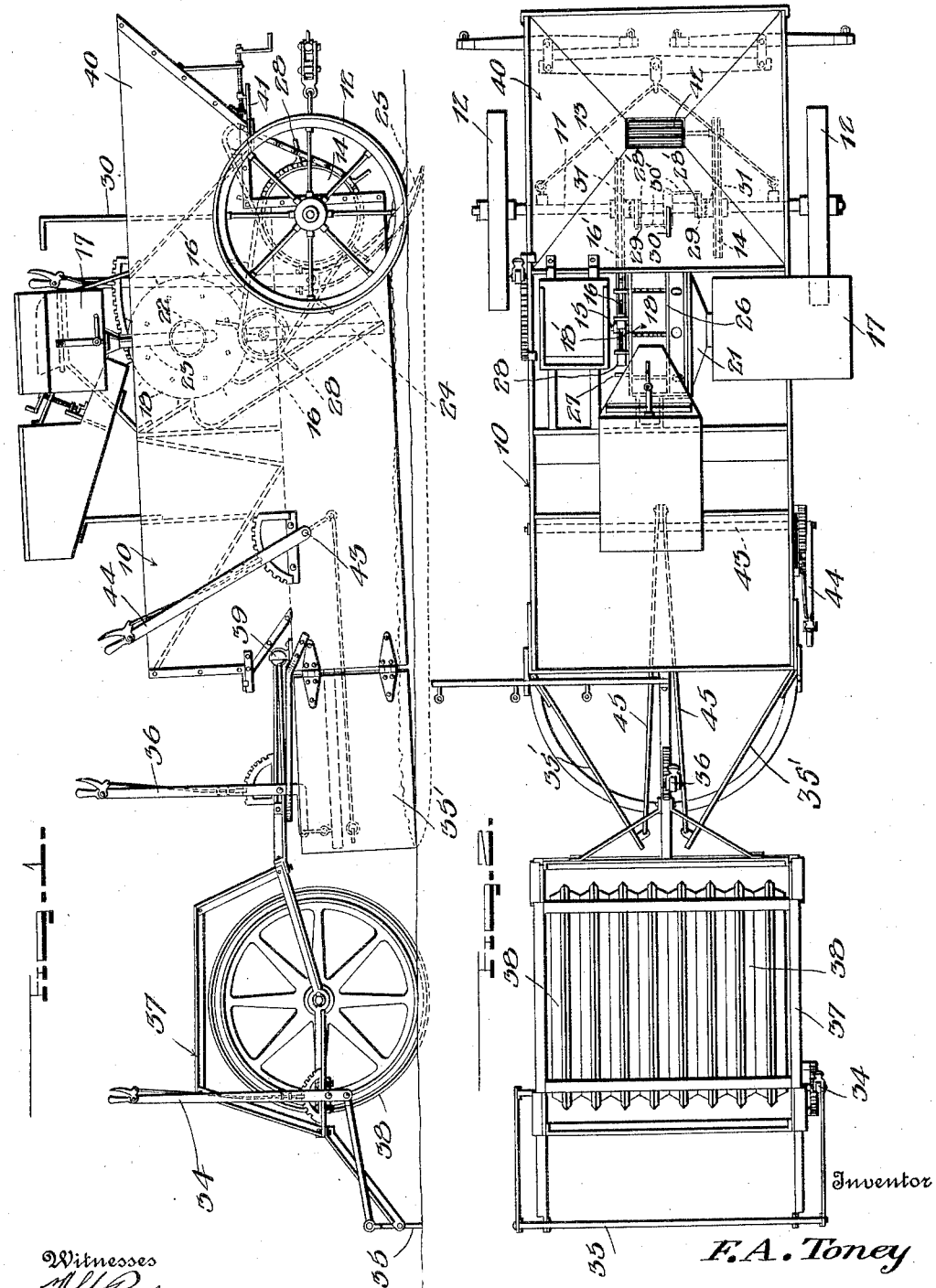
Witnesses
W. H. Rockwell
Harry M. Test
Inventor
F. A. Toney
By 
Attorneys

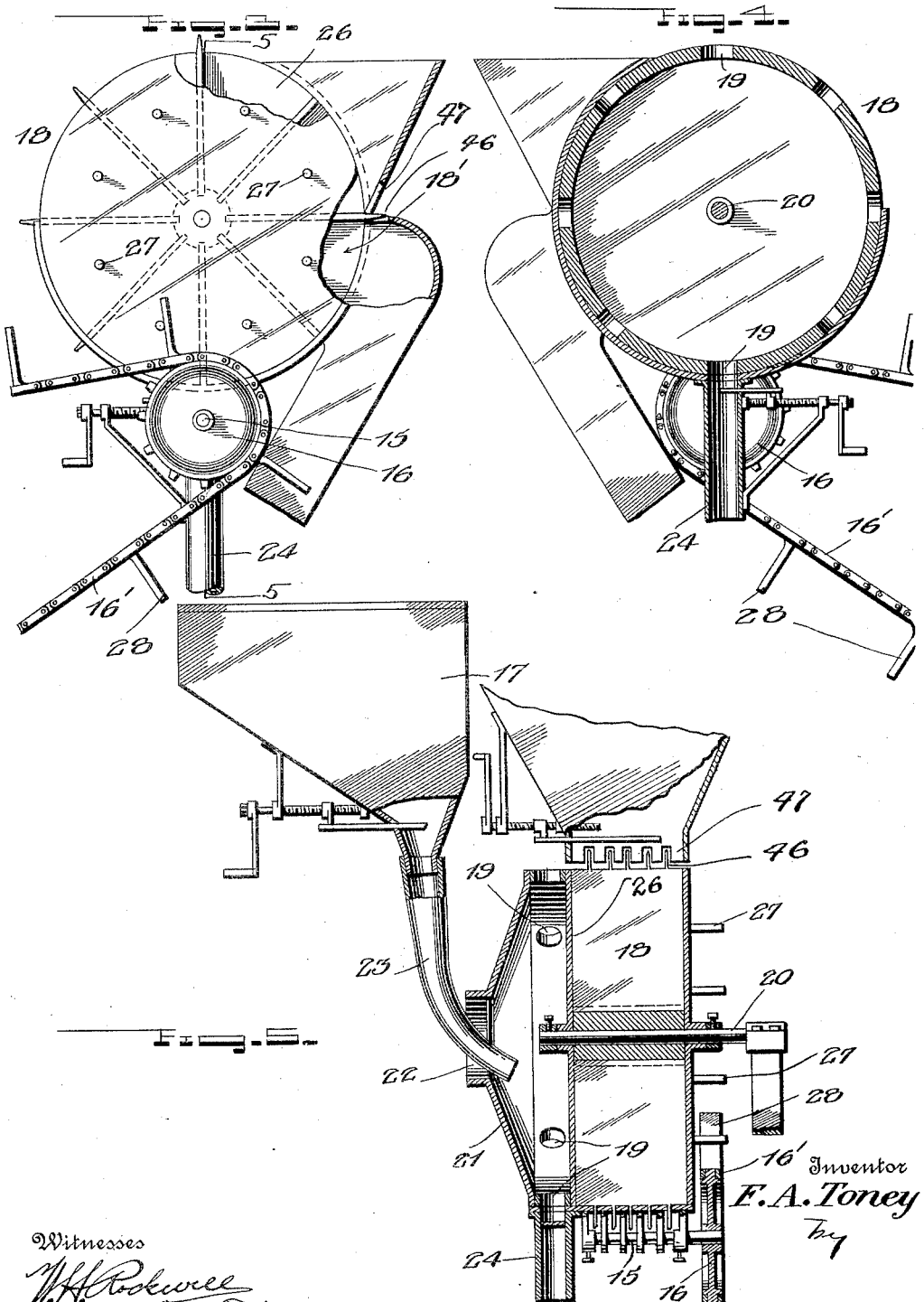

UNITED STATES PATENT OFFICE.

FREDERICK A. TONEY, OF GREENACRES, WASHINGTON.

COMBINATION-PLANTER.

1,081,345.  Specification of Letters Patent.  Patented Dec. 16, 1913.

Application filed September 6, 1912.  Serial No. 718,949.

*To all whom it may concern:*

Be it known that I, FREDERICK A. TONEY, a citizen of the United States, residing at Greenacres, in the county of Spokane, State of Washington, have invented certain new and useful Improvements in Combination-Planters; and I do hereby declare the following to be a full, clear, and exact description of the invention, such as will enable others skilled in the art to which it appertains to make and use the same.

This invention relates to improvements in planters, and has particular reference to a planter for planting different kinds of seeds, as for instance: dry grain and potatoes.

The principal object is to provide a simple device of this character with a limited means for driving the seeding mechanism.

Another object is to provide a machine of this character which will work the soil, after the deposit of the seed, and cover the seed and level the soil thereafter, said operation taking place in the same machine.

Other objects and advantages will be apparent from the following description and with particular reference to the accompanying drawings.

In the drawings: Figure 1 is a side elevation of a planter made in accordance with my invention, Fig. 2 is a top plan view, Fig. 3 is an enlarged side elevation of the rotary seed drum, Fig. 4 is a vertical section of the seed drum, and Fig. 5 is a vertical transverse sectional view on the line 5—5 of Fig. 3.

Referring particularly to the drawings, 10 represents the frame of the machine, which is provided with a transverse axle or shaft 11, having on its ends the supporting or traction wheels 12. On the middle portion of the shaft 11 are arranged a pair of loosely running sprocket wheels 13 and 14 and also mounted in the frame at a suitable distance in the rear of the shaft is another shaft 15, carrying thereon a sprocket wheel 16, to receive rotary motion from the axle shaft by means of a chain 16'.

Mounted on the frame just above the shaft 11 is a seed hopper 17, and adjacent this hopper is mounted a hollow seed drum 18, said drum having a series of openings 19 in its outer periphery and said drum being mounted to rotate on the transverse shaft 20 mounted in the frame. Inclosing one side of the seed drum and having an opening 22 is a conical casing 21. A pipe 23 leads from the hopper 17, so that the seed from the hopper can be delivered into the interior of the drum. In the lower portion of the casing 21 below the seed portion of the drum is arranged a seed boot or tube 24, which extends down close to the ground immediately in the rear of the ground opening shovels 25. The drum 18 has a partition wall 26, which separates the seed drum from the potato chamber 18'.

On the outer end of each of the partitions of the potato chamber are arranged a plurality of outwardly-extending knives 46, for co-action with stationary knives 47 formed on the lower edge of the potato hopper.

Extending laterally from one side of the drum is a circular series of pins 27, and at suitably spaced intervals on the chain 16' are the pins 28, the chain pins being adapted to pins 28, the chain pins being adapted to engage with the pins 27 on the drum 18, so that the drum will be positively rotated through part of the circle, to bring one of the openings, 19 in register with the upper end of the tube 24, and deliver a predetermined amount of seed to the seed boot 24. The drum is loosely mounted on the shaft 20 and only turned when one of the pins 28 of the chain engages one of the pins 27. Slidably arranged on the axle 11 adjacent each of the sprocket wheels 13 and 14 is a clutch member 29 which is connected to a shifting lever 30 by means of the links 30'. On one side of each of the sprocket wheels 13 and 14 is a clutch face 31 for engagement, respectively, with similar clutch faces on the sliding members 29. As before-mentioned the sprocket wheels 13 and 14 run idly on the axle shaft 11, the sliding members 29 being keyed to the shaft, but slidable thereon, and when the lever 30 is moved in one direction, the members 29 will be moved into engagement with the clutch faces 31, and drive so that they will rotate with the axle shaft and drive the seed drum.

In the rear portion of the frame of the machine is arranged the transverse scraping or smoothing blade 35 which is adapted to be raised and lowered by means of the hand levers 34. At a suitable distance in the rear of the drum are arranged the swinging blades 35', which are adapted to cover the seed deposited by the drum, said blades or covers being adapted to be raised and lowered by the lever 36.

Extending through the frame 10 is a shaft 43, on one end of which is mounted a lever 44, said shaft being connected to the blades 35' by means of the links 45, so that the blades may be opened or closed.

The scraper blades 35' before-mentioned are connected to a frame 37, in which frame is journaled the corrugated roller 38 for packing down the soil, after the seed has been deposited and covered, said frame being attached to the frame of the planter by the couplings 39.

In the forward part of the machine is mounted a hopper 40 which is adapted to contain fertilizer, to be deposited in front of the ground opening shovel 25, the bottom of the said hopper having a regulating valve 41. The feeding roller 42 in the outlet of the hopper being rotated by means of a chain 14 from the drive shaft 11 on the sprocket wheels 14.

What is claimed is:

1. A wheeled planter including a frame, a drive shaft, a hopper on the frame, a rotatable pocketed potato drum adjacent the hopper and provided with outlet openings, knives on the drums at the outlet openings, a driven shaft adjacent the hopper, a chain for communicating motion from the drive shaft to the driven shaft, means on the chain for engagement with means on the feed drum for intermittently moving the feed drum, and cutting knives on the driven feed drum shaft coöperating with the first knives to cut the potatoes as they fall through the opening.

2. A wheeled planter which includes a hopper, a rotatable feed drum adjacent the hopper, a driven chain, lateral projections on the feed drum, and projections on the chain for engagement with the drum projections for intermittently rotating the feed drum.

3. A wheeled planter including a frame, a drive shaft, a hopper, a rotatable pocketed feed drum adjacent the hopper, said feed drum having outlet openings in its periphery, connections between the hopper and drum for delivering seed centrally into the side of the drum, seed boots for conveying seed from the drum to the soil, and means directly engaging the drum for intermittently rotating the drum.

In testimony whereof, I affix my signature, in presence of two witnesses.

FREDERICK A. TONEY.

Witnesses:
C. B. SAWYER,
E. R. DALTON.